United States Patent [19]

Rosenberg

[11] Patent Number: 5,261,607
[45] Date of Patent: Nov. 16, 1993

[54] WATER SPRAYER ASSEMBLY AND FLUID COUPLING DEVICE PARTICULARLY USEFUL THEREIN

[76] Inventor: Peretz Rosenberg, 30 046 Moshav Beit Shearim, Moshav Beit Shearim, Israel

[21] Appl. No.: 957,855

[22] Filed: Oct. 8, 1992

[30] Foreign Application Priority Data

Oct. 11, 1991 [IL] Israel .......................................... 99718

[51] Int. Cl.⁵ .............................................. B05B 1/30
[52] U.S. Cl. ................................... 239/276; 239/280; 239/443; 137/625.47
[58] Field of Search ............... 239/273, 276, 280, 443, 239/436, 582.1, 581.1; 251/341, 343, 344, 345, 120; 137/625.47

[56] References Cited

U.S. PATENT DOCUMENTS

| | | | |
|---|---|---|---|
| 2,678,846 | 5/1954 | Rogers et al. | 239/582.1 |
| 3,431,732 | 3/1969 | Lovingham et al. | 251/344 |
| 4,982,760 | 1/1991 | Mustaklem | 137/625.47 X |
| 4,997,007 | 3/1991 | Niemann et al. | 137/625.47 |

FOREIGN PATENT DOCUMENTS 264718 5/1963 Australia ............................ 239/276

*Primary Examiner*—Andres Kashnikow
*Assistant Examiner*—Lesley D. Morris
*Attorney, Agent, or Firm*—Benjamin J. Barish

[57] ABSTRACT

A water sprayer assembly particularly useful for spraying trees includes a ground stake insertable into the ground, and a housing fixed to the ground stake at its upper end. The housing includes a water sprayer at its upper end for spraying water from under a tree, a first coupling device for coupling the housing to a water supply pipe, and a second coupling device for coupling the housing to one end of a water feed tube having a water sprayer at its opposite end attachable to a tree for spraying water to prevent freezing or undue heating of the tree.

15 Claims, 4 Drawing Sheets

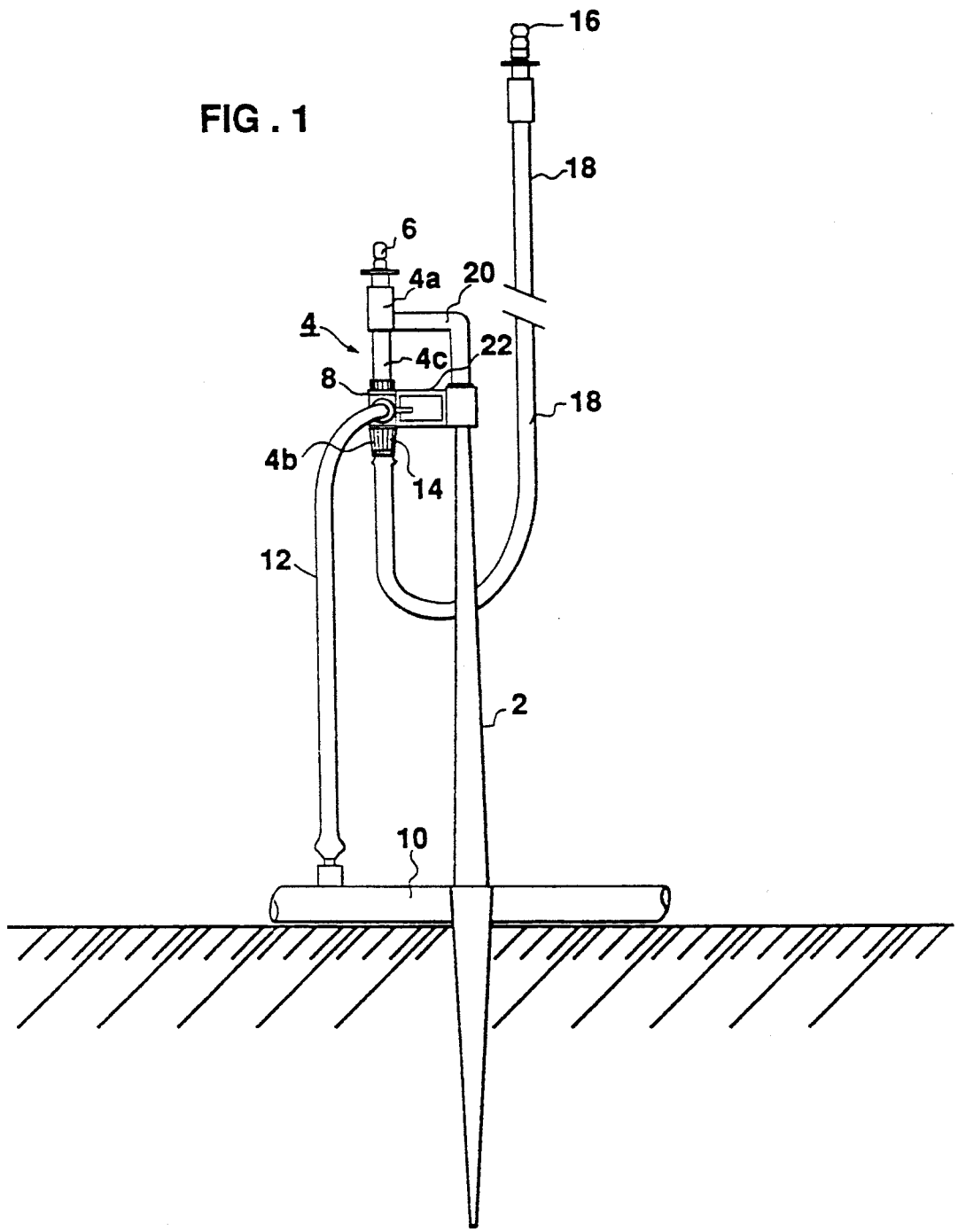

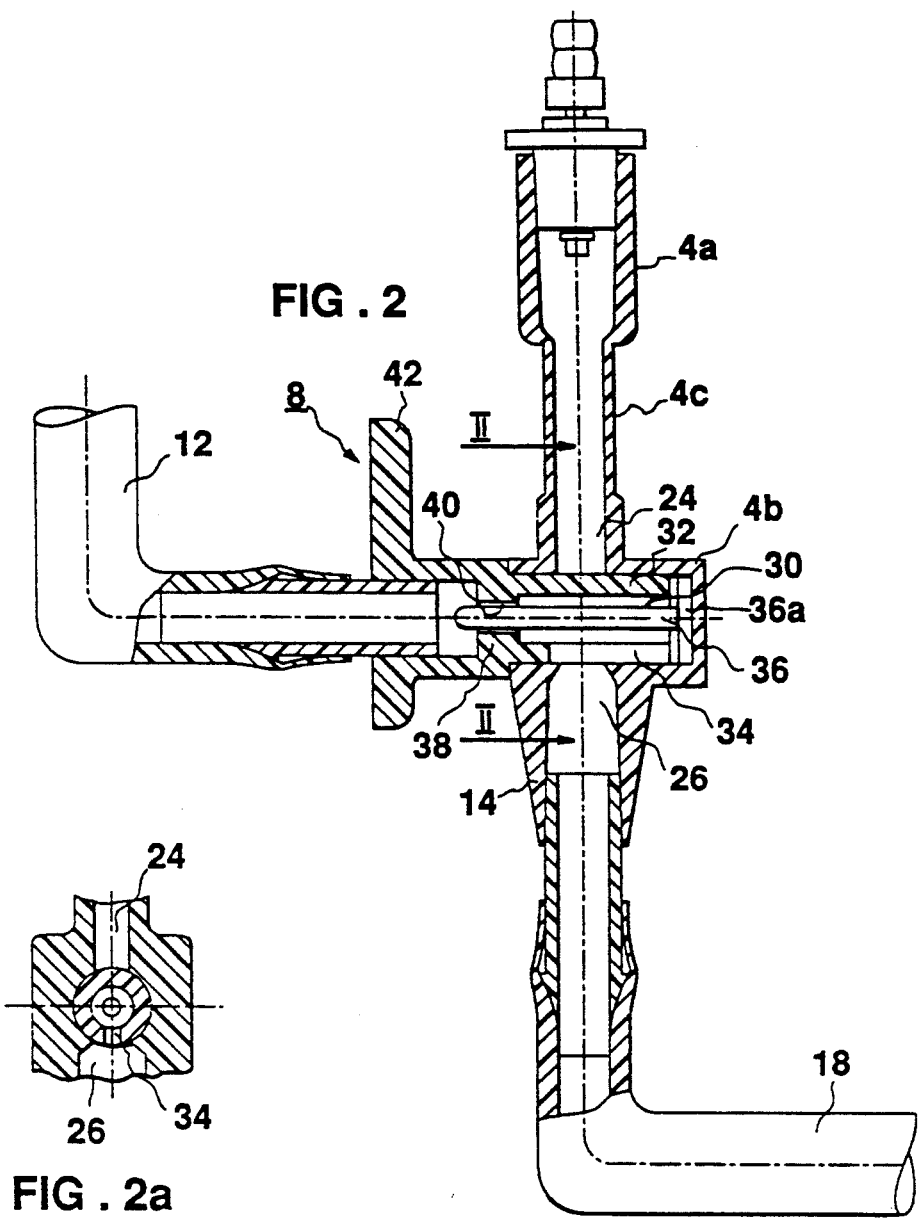
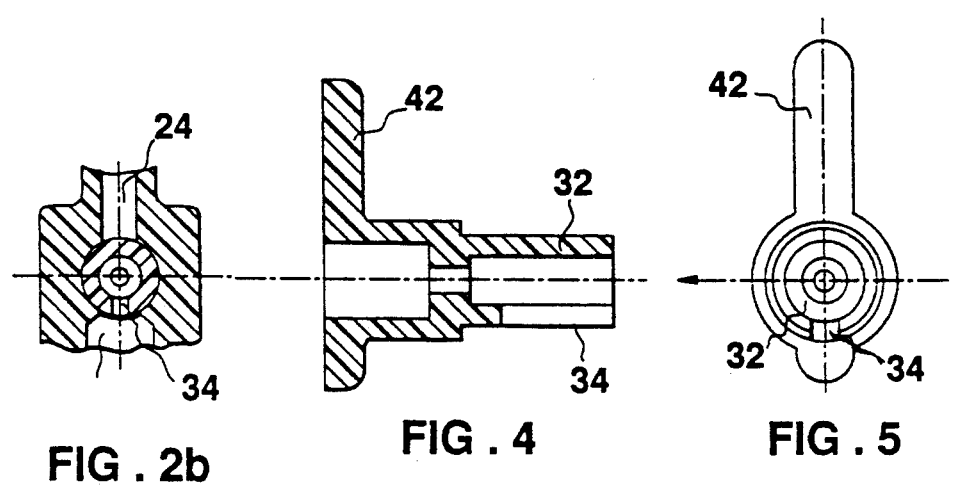

WATER SPRAYER ASSEMBLY AND FLUID COUPLING DEVICE PARTICULARLY USEFUL THEREIN

FIELD AND BACKGROUND OF THE INVENTION

The present invention relates to a water sprayer assembly, and also to a fluid coupling device particularly useful in such an assembly.

Trees are frequently irrigated by water sprayer assemblies which spray water under the tree. Trees are also frequently protected against frost on the one hand, or undue heating on the other hand, by sprayers which apply a fine spray or mist around the tree; the spray releases heat during freezing conditions to prevent freezing of the tree, and absorbs heat during unusually hot conditions to prevent undue heating of the tree. At the present time, the two types of sprays are applied by separate sprayer assemblies.

OBJECTS AND BRIEF SUMMARY OF THE INVENTION

One object of the present invention is to provide a water sprayer assembly which can serve both of the above functions.

Another object of the present invention is to provide a coupling device particularly useful in the novel water sprayer assembly, which coupling device removes large solid particles from the water before entering the sprayer, and also is self-cleanable in a convenient and quick manner.

According to one aspect of the present invention, there is provided a water sprayer assembly comprising: a ground stake insertable into the ground, and a housing fixed to the ground stake at the upper end thereof; the housing including: a water sprayer at one end of the housing for spraying water from under a tree; a first coupling device for coupling the housing to a water supply pipe; a flexible feed tube coupled atone end to said second coupling device; and a water sprayer at the opposite end of said water feed tube and attachable to a tree for spraying water to prevent freezing or undue heating of the tree.

It will thus be seen that a water sprayer assembly constructed in accordance with the foregoing features may be used for irrigating the tree and/or for spraying the tree in order to prevent freezing or undue heating of the tree.

According to another aspect of the present invention, there is provided a fluid coupling device for coupling a fluid supply member to a fluid-operated member, comprising: a socket formed in one of the members; and a sleeve carried by the other of the members and removably receivable in the socket; the socket being formed with a pin extending axially of the socket; the sleeve being formed with a transversely-extending wall having an aperture of slightly larger diameter than that of the pin receiving the pin and providing a clearance with respect thereto to define a flow passageway for the water flowing from a water supply pipe via the clearance into the socket. In such a coupling device, the clearance between the pin and the aperture formed in the transversely-extending wall of the sleeve determines the discharge rate of the fluid from the fluid supply member to the fluid-operated member. This clearance also removes solid particles that may be in the fluid supply and prevents their passage to the fluid-operated member where they may tend to clog it. Moreover, the sleeve is self-cleaning by merely pulling it out of the socket.

The fluid coupling device is particularly useful in the novel water sprayer assembly described above. When so used, the socket is formed with at least one outlet, and the sleeve is formed with at least one opening in a wall thereof and is rotatable in the socket to bring the opening into, or out of, alignment with respect to the outlet.

In one described embodiment, the sleeve is formed with a single opening in its wall such that: in a first position of the sleeve it establishes communication between the water supply pipe and the sprayer; in a second position of the sleeve it establishes communication between the water supply pipe and the second coupling device; and in a third position of the sleeve it interrupts communication between the water supply pipe and both the sprayer and the second coupling device.

In a second described embodiment, the sleeve is formed with a plurality (three in the described example) of openings in its wall such that: in a first position of the sleeve, it establishes communication between the water supply pipe and the sprayer; in a second position of the sleeve it establishes communication between the water supply pipe and the second coupling device; in a third position of the sleeve it establishes communication between the water supply pipe and both the sprayer and second coupling device; and in a fourth position of the sleeve, it interrupts communication between the water supply pipe and both the sprayer and the second coupling device.

Further features and advantages of the invention will be apparent from the description below.

BRIEF DESCRIPTION OF THE DRAWINGS

The invention is herein described, by way of example only, with reference to the accompanying drawings, wherein:

FIG. 1 illustrates one form of water sprayer assembly constructed in accordance with the present invention;

FIG. 2 is an enlarged, longitudinal-sectional view, of a part of the assembly of FIG. 1;

FIG. 2a is a sectional view along line A—A of FIG. 2;

FIG. 2b is a view similar to that of FIG. 2a but showing another position of the sleeve in the water sprayer assembly;

FIG. 4 is a sectional view illustrating only the sleeve in the coupling device of FIGS. 2 and 3;

FIG. 5 is an end view of the sleeve of FIG. 4;

DESCRIPTION OF PREFERRED EMBODIMENTS

Figure 3:
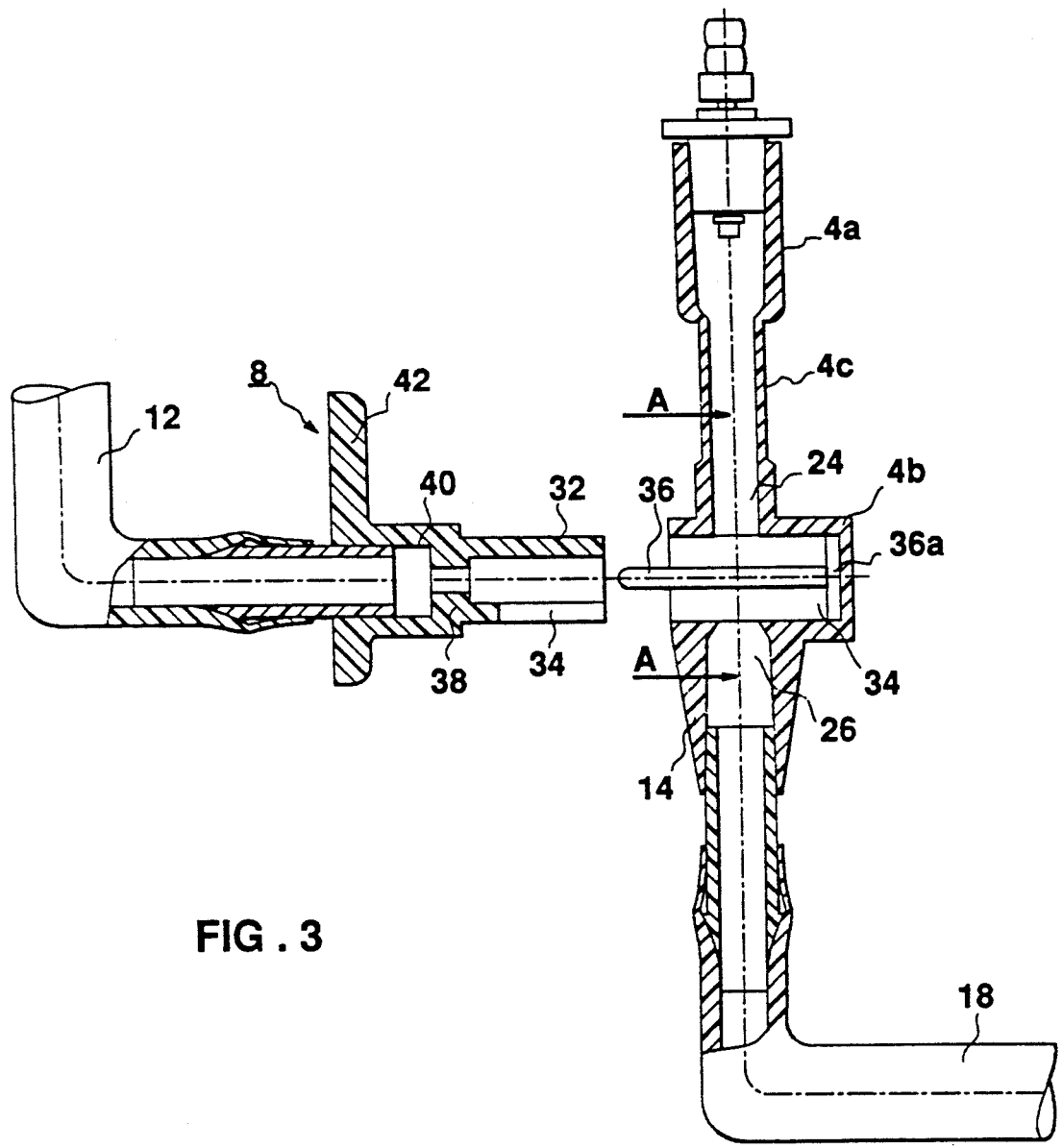
FIG. 3 is a view similar to that of FIG. 2 but showing the coupling device in its decoupled condition.

The sprayer assembly illustrated in FIG. 1 comprises a ground stake 2 insertable into the ground and having a housing 4 fixed at its upper end for a water sprayer 6 which sprays the water on the ground under the tree. Housing 4 is formed of an upper section 4a carrying the water sprayer 6 at its upper end, and a lower section 4b secured thereto by a rigid tube 4c. The lower housing section 4b includes a side-mounted coupling device 8 for coupling a water supply pipe 10 to the housing via a water feed tube 12. Housing section 4b further includes a bottom-mounted coupling device 14 for coupling to the housing section a second water sprayer 16 via a second feed tube 18.

The upper housing section 4a is secured to the upper end of stake 2 by a laterally-extending bracing arm 20, and the lower housing section 4b is also secured to the stake by a laterally-extending bracing arm 22.

The lower housing section 4b is formed with an outlet 24 (FIG. 2) leading to the water sprayer 6, and with a second outlet 26 on its opposite side leading to water sprayer 16.

Preferably, stake 2 is integrally formed, (e.g., by injection moulding) with the two housing sections 4a, 4b, the rigid tube 4c connecting the two sections together, and the two laterally-extending bracing arms 20 and 22.

In use, the water sprayer 6 normally applies irrigating water to the ground under the tree; and water sprayer 16 may be secured to the tree in order to apply a fine spray or mist of water to prevent freezing of the tree during extreme cold conditions, or undue heating of the tree during extreme hot conditions.

FIGS. 2-5 more particularly illustrate the construction of the housing 4 and particularly its coupling device 8 for coupling the water supply pipe 10 to either the lower water sprayer 6 or to the upper water sprayer 16.

As shown particularly in FIG. 2, the lower housing section 4b is formed with a cylindrical bore defining a socket 30, and coupling device 8 includes a cylindrical sleeve 32 removably and rotatably received in socket 30. Sleeve 32 is formed with an elongated opening 34 which, by rotation of sleeve 32, may be aligned either with outlet 24 leading to the water sprayer 6, or with outlet 26 leading to the water sprayer 16. Sleeve 32 may also be rotated to a third position wherein its opening 34 is not aligned with either outlet, thereby interrupting the flow of the water to both water sprayers.

Socket 30 further includes a pin 36 formed with an enlarged head 36a press-fitted into the socket such that the pin extends axially through the socket. Sleeve 32 is formed with a transversely-extending wall 38 having an aperture 40 of slightly larger diameter than pin 36 so as to provide a clearance with respect to the pin, and thereby to define a flow passageway for the water flowing from tube 12 into the socket 30 in housing section 4b. Sleeve 32 is further formed with a fingerpiece 42 to facilitate its rotation in socket 30, and also to facilitate its removal from the socket.

The manner of using the water sprayer assembly illustrated in FIGS. 1-5 will be apparent from the above description.

Thus, whenever it is desired to feed the water from the water supply pipe 10 to the water sprayer 6 for irrigating the ground around the tree, fingerpiece 42 of sleeve 32 is manipulated to rotate the sleeve such as to bring its opening 34 into alignment with outlet 24 as shown in FIG. 2b; and whenever it is desired to feed the water from the water supply pipe 10 to the water sprayer 16 attached to the tree (e.g., to produce a mist for absorbing heat under undue cold conditions, so as to prevent frost), sleeve 32 is rotated, via its fingerpiece 42, to bring opening 34 into alignment with outlet 26 as shown in FIG. 2a Under both conditions, the small clearance between pin 36 and opening 40 in transverse wall 38 of the sleeve fixes the rate of flow of the water to either sprayer and also removes relatively large particles from the water which may tend to clog the sprayers. Such particles tend to accumulate within sleeve 32.

Whenever it is desired to flush out the particles from sleeve 32, the sleeve may be removed from the socket 34, as shown in FIG. 3, whereupon the particles accumulated within the sleeve are flushed out through the aperture 40 whose diameter is effectively increased by the removal of the sleeve from pin 36.

Figure 6:
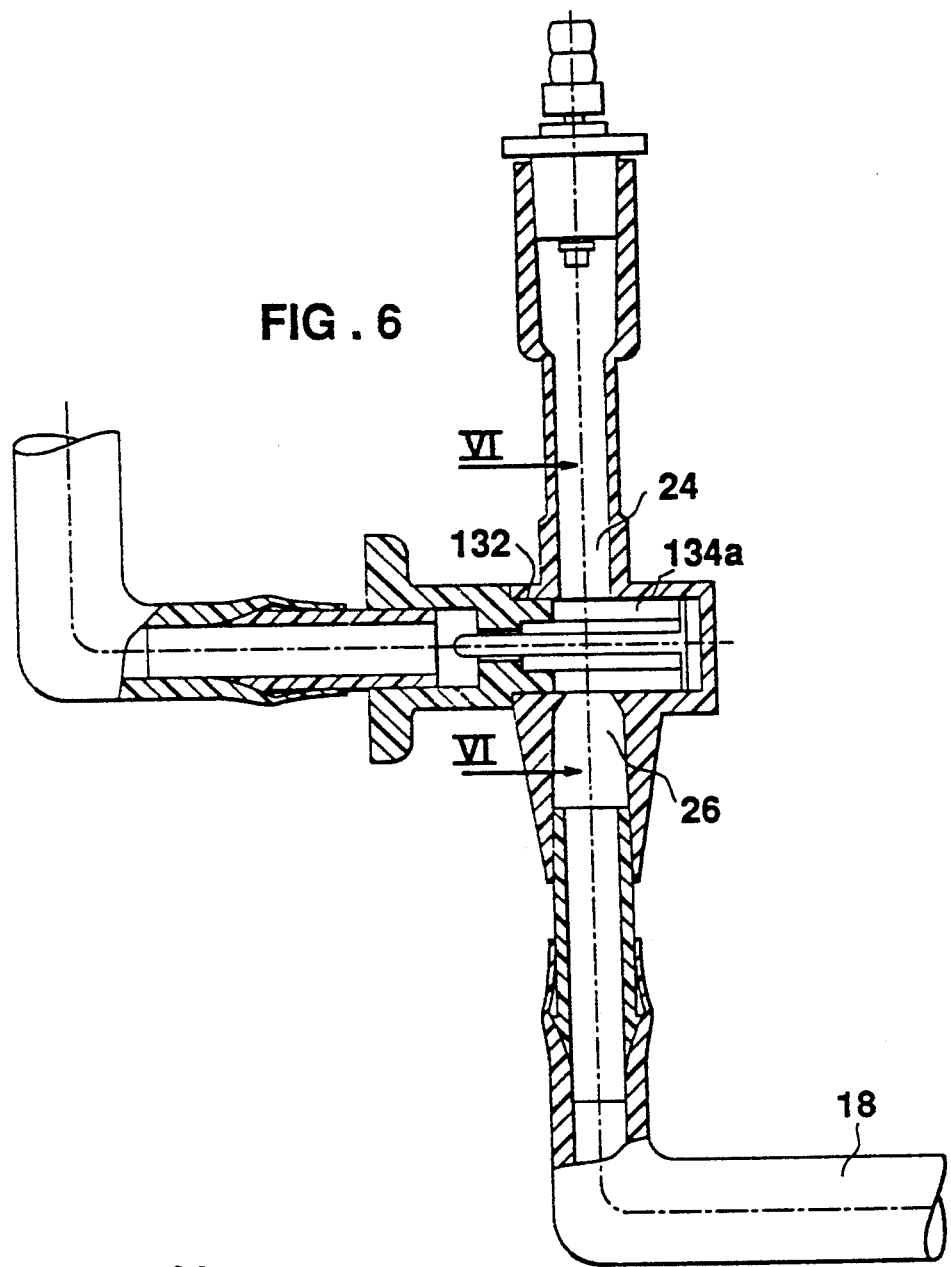
FIG. 6 is a view similar to that of FIG. 2 but illustrating a modification in the coupling device.
Figure 6A:
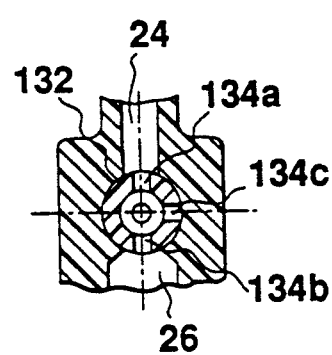
FIG. 6a is a sectional view along line VI—VI of FIG. 6.

FIGS. 6 and 6a illustrate a variation in the construction of the assembly of FIGS. 1-5. In this variation, the sleeve, therein designated 132, is formed with three openings 134a, 134b, 134c. The first two are located along a diametrical line through the sleeve; and the third opening, 134c is located in between the first two. The arrangement enables the sleeve to be rotated to any one of four positions: in the first position, the sleeve establishes contact between the water supply pipe (10, FIG. 1) and sprayer 6; in the second position, it establishes communication between the water supply pipe and sprayer 16; in the third position (that illustrated in FIG. 6a), it establishes communication between the water supply pipe and both sprayers; and in the fourth position it interrupts the communication between the water supply pipe and both sprayers.

In all other respects, the water sprayer assembly illustrated in FIGS. 6 and 6a is constructed in the same manner, operates in the same manner, and has the same advantages, as the water sprayer assembly described above with respect to FIGS. 1-5.

While the invention has been described with respect to two preferred embodiments, it will be appreciated that many other variations, modifications and applications of the invention may be made.

What is claimed is:

1. A water sprayer assembly particularly useful for spraying trees, comprising:
    a ground stake insertable into the ground, and a housing fixed to the ground stake; said housing including:
    a water sprayer at one end of the housing for spraying water from under a tree;
    a first coupling device for coupling the housing a water supply pipe;
    a second coupling device;
    a flexible water feed tube coupled at one end to said second coupling device;
    and a water sprayer at the opposite end of said water feed tube attachable to a tree for spraying water to prevent freezing or undue heating of the tree.

2. The assembly according to claim 1, wherein said housing includes:
    a first housing section secured to the stake by a first arm extending laterally of the stake and receiving said first and second coupling devices;
    and a second housing section secured, by a second arm extending laterally of the stake, to the stake receiving said water sprayer;
    said second housing section being secured to said first housing section by a rigid tube extending axially of said two housing sections.

3. The assembly according to claim 1, wherein:
    said housing comprises a socket having a first outlet communicating with said sprayer, and a second outlet communicating with said second coupling device;

said first coupling device comprises a sleeve removably receivable in said socket and formed with at least one opening in a wall thereof;

said socket is formed with a pin extending axially of the socket;

said sleeve is formed with an aperture of slightly larger diameter than that of said pin receiving said pin and providing a clearance with respect thereto to define a flow passageway for the water flowing from a water supply pipe via said clearance into said socket;

and said sleeve is manually rotatable to align said opening in the wall of said sleeve with either said first outlet or said second outlet.

4. The assembly according to claim 3, wherein said pin is formed with an enlarged head which is press-fitted into said socket.

5. The assembly according to claim 3, wherein said sleeve is formed with a single opening in its wall such that:
- in a first position of the sleeve it establishes communication between the water supply pipe and the sprayer;
- in a second position of the sleeve it establishes communication between the water supply pipe and the second coupling device; and
- in a third position of the sleeve it interrupts communication between the water supply pipe and both the sprayer and the second coupling device.

6. The assembly according to claim 3, wherein said sleeve is formed with a plurality of openings in its wall such that:
- in a first position of the sleeve, it establishes communication between the water supply pipe and the sprayer;
- in a second position of the sleeve it establishes communication between the water supply pipe and the second coupling device;
- in a third position of the sleeve it establishes communication between the water supply pipe and both the sprayer and second coupling device; and
- in a fourth position of the sleeve, it interrupts communication between the water supply pipe and both the sprayer and the second coupling device.

7. A water sprayer assembly particularly useful for spraying trees, comprising:
- a ground stake insertable into the ground, and a housing fixed to the ground stake at on upper end thereof; said housing including:
- a water sprayer at the upper end of the housing for spraying water from under a tree;
- a first coupling device for coupling the housing to a water supply pipe;
- a second coupling device for coupling the housing to one end of a water feed tube having a water sprayer at its opposite end attachable to a tree for spraying water to prevent freezing or undue heating of the tree;
- a first housing section secured to an upper end of the stake by a first arm extending laterally of the stake and receiving said first and second coupling devices;
- a second housing section secured, by a second arm extending laterally of the stake, to the upper end of the stake receiving said water sprayer;
- and a rigid tube securing said second housing section to said first housing section and extending axially of said two housing sections.

8. The assembly according to claim 7, wherein said housing comprises a socket having a first outlet communicating with said sprayer, and a second outlet communicating with said second coupling device;

and said first coupling device comprises a sleeve removably receivable in said socket and formed with at least one opening in a wall thereof;

said socket being formed with a pin extending axially of the socket;

said sleeve being formed with an aperture of slightly larger diameter than that of said pin receiving said pin and providing a clearance with respect thereto to define a flow passageway for the water flowing from a water supply pipe via said clearance into said socket;

said sleeve being manually rotatable to align said opening in the wall of said sleeve with either said first outlet or said second outlet.

9. The assembly according to claim 8, wherein said pin is formed with an enlarged head which is press-fitted into said socket.

10. The assembly according to claim 8, wherein said sleeve is formed with a single opening in its wall such that:
- in a first position of the sleeve it establishes communication between the water supply pipe and the sprayer;
- in a second position of the sleeve it establishes communication between the water supply pipe and the second coupling device; and
- in a third position of the sleeve it interrupts communication between the water supply pipe and both the sprayer and the second coupling device.

11. The assembly according to claim 8, wherein said sleeve is formed with a plurality of openings in its wall such that:
- in a first position of the sleeve, it establishes communication between the water supply pipe and the sprayer;
- in a second position of the sleeve it establishes communication between the water supply pipe and the second coupled device;
- in a third position of the sleeve it establishes communication between the water supply pipe and both the sprayed and second coupling device; and
- in a fourth position of the sleeve, it interrupts communication between the water supply pipe and both the sprayer and the second coupling device.

12. A fluid coupling device for coupling a fluid supply member to a fluid-receiving member, comprising:
- a socket formed in one of said members;
- and a sleeve carried by the other of said members and removably receivable in said socket;
- said socket being formed with a pin extending axially of the socket;
- said sleeve being formed with a transversely-extending wall having an aperture of slightly larger diameter than that of said pin receiving said pin and providing a clearance with respective thereto to define a flow passageway for water flowing from a water supply pipe via said clearance into said socket;
- said socket being formed with at least one outlet, and said sleeve being formed with at least one opening in a wall thereof and being rotatable in said socket to bring said opening into, or out of, alignment with respect to said outlet.

13. The device according to claim 12, wherein said pin is formed with an enlarged head which is press-fitted into said socket.

14. The device according to claim 12, wherein said sleeve is formed with a single opening in its wall such that:
- in a first position of the sleeve it establishes communication between the water supply pipe and the sprayer;
- in a second position of the sleeve it establishes communication between the water sprayer and the second coupling device; and
- in a third position of the sleeve it interrupts communication between the water supply pipe and both the sprayer and the second coupling device.

15. The device according to claim 12, wherein said sleeve is formed with a plurality of openings in its wall such that:
- in a first position of the sleeve, it establishes communication between the water supply pipe and the sprayer;
- in a second position of the sleeve it establishes communication between the water supply pipe and the second coupling device;
- in a third position of the sleeve it establishes communication between the water supply pipe and both the sprayer and second coupling device; and
- in a fourth position of the sleeve, it interrupts communication between the water supply pipe and both the sprayer and the second coupling device.

* * * * *